April 2, 1929.  R. J. BUSH  1,707,250
ANGLE COCK DEVICE
Filed Dec. 9, 1927
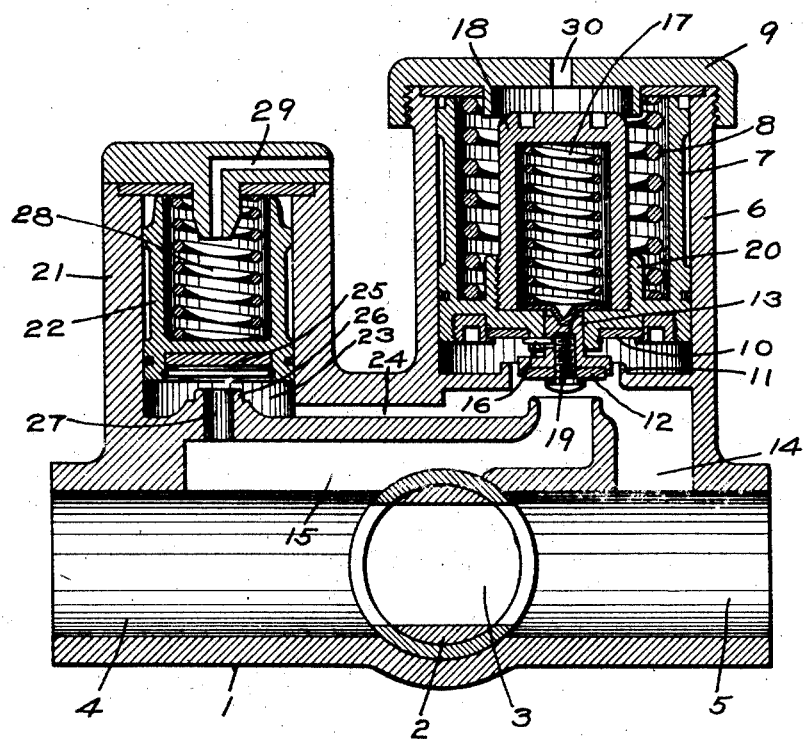
INVENTOR
RANKIN J. BUSH
BY *Wm. M. Cady*
ATTORNEY Patented Apr. 2, 1929.

1,707,250

UNITED STATES PATENT OFFICE.

RANKIN J. BUSH, OF McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed December 9, 1927. Serial No. 238,843.

This invention relates to fluid pressure brakes and more particularly to an angle cock device for opening and closing communication through the brake pipe at the end of the car.

The principal object of my invention is to provide an angle cock device having a by-pass for maintaining communication through the brake pipe in case the cock key should be accidentally or maliciously turned to its closed position and having means whereby an uncharged section of a train may be charged from a charged section without causing a sudden reduction in pressure in the charged section and a consequent emergency application of the brakes.

In the accompanying drawing, the single figure is a diagrammatic sectional view of an angle cock device embodying my invention.

As shown in the drawing, the angle cock device may comprise a casing 1 containing the usual plug valve or key 2 adapted to be operated by the usual handle (not shown). The valve 2 is provided with a waterway 3 adapted in the open position of the valve to connect the conduit 4 at the brake pipe end of the angle cock with the conduit 5 at the flexible hose end.

Associated with the casing 1 is a cylinder 6 containing a valve piston 7. At one side, the valve piston is subject to the pressure of a coil spring 8 which is held in place by a cover plate 9 and at the other side, the valve piston is provided with a valve seat 10 adapted to engage a seat rib 11, the chamber at the spring side of the valve piston 7 being connected to a passage 30, open to the atmosphere.

A valve 12 having a stem 13, slidably mounted in a central bore of the valve piston 7, controls communication from a chamber 14 open to the conduit 5, to a passage 15 which leads to conduit 4. The valve 13 is held in the valve piston 7 by means of a pin 16 secured in a flange portion of the valve piston and extending into an elongated slot provided in the stem 13. A coil spring 17, disposed within a chamber of a spring cap 18, acts through a spring follower 19 on the valve stem 13, so that movement of the valve 13 relative to the valve piston 7 is resisted by said spring. The valve piston 7 is provided with an interiorly threaded annular flange 20 for receiving the threaded end of the spring cap 18.

A second cylinder 21 is carried by the casing 1 and mounted therein is a valve piston 22 having the chamber 23 at one side connected by a passage 24 with chamber 14 and having a valve seat 25 for engaging a seat rib 26 in order to control communication from chamber 23 to a passage 27 which opens into passage 15. At the opposite side, the valve piston 22 is subject to the pressure of a coil spring 28 and the spring side of the valve piston is connected to an atmospheric passage 29.

In operation, when a charged train section is to be connected to an uncharged train section, after the usual hose couplings are coupled together, the plug valve 2 of the angle cock on the uncharged section is turned to its open position and then the adjacent plug valve 2 on the charged section is turned to a slightly opened position, such that the rate of flow from conduit 4 through the waterway 3 to conduit 5 will be slow enough to prevent a reduction in fluid pressure in the charged section of the brake pipe at an emergency rate.

In the angle cock device on the charged section of the train, the valve piston 7 will be initially held with the valve seat 10 engaging the seat rib 11 by the action of spring 8 and the valve 12 will also be held seated.

Fluid supplied from the conduit 5 to chamber 14, flows through passage 24 to chamber 23 and acts on the area of the valve piston 22 outside of the seat rib 26. When the pressure of fluid has been increased to a degree, slightly exceeding the pressure of spring 28, for example five or six pounds, the valve piston 22 will be lifted from its seat, exposing the full area of the valve piston to the fluid pressure in chamber 23. Said valve piston is then quickly shifted to its upper seat. Fluid under pressure can now flow from the conduit 4 through passage 27 to chamber 23 and thence through passage 24 and chamber 14 to conduit 5.

The flow area of passage 27 is restricted sufficiently to prevent the combined flow through the passage 27 and the slight opening at the plug valve 2 from causing an emergency rate of reduction in the conduit 4 by flow to conduit 5.

When the pressure in the conduit 5 has been increased to a predetermined high degree, for example fifty pounds, the pressure of fluid acting on the exposed area of the valve piston 7 within the seat rib 11, will be sufficient to ovecome the opposing pressure of spring 8, so that the valve piston 7 will be lifted from its seat. The full area of the valve piston 7 is then exposed to the pressure of fluid in chamber 14 and consequently the valve piston is quickly shifted to its upper seat.

The flow area of the passage 15 is sufficient to permit an emergency rate of flow, so that an emergency rate of reduction in brake pipe pressure as well as a service rate of reduction may be effected through the by-pass around the plug valve, even though the plug valve should be in its closed position. After the valve 12 has been moved from its seat, the pressure of fluid in the conduit 4 fully equalizes into the conduit 5 and the plug valve 2 may then be moved to its full open position, as shown in the drawing.

By providing a small area of the valve piston 7 which is subject to fluid pressure in the closed position of the valve 12, the spring 8 may be of such reduced pressure, that when the valve piston is in its open position, with the full area exposed to fluid pressure, it requires a reduction in fluid pressure to a relatively low degree to permit the movement of the valve piston so as to effect the seating of the valve 12. As a consequence, possible seating of the valve 12 when the brake pipe pressure is reduced to effect a full service application of the brakes will be prevented.

The valve 12 being provided with means to permit relative movement thereof with respect to the valve piston 7, the seating of the valve 12 as well as the valve seat 10 against the seat rib 11 is always assured and the valve 12 will remain seated until after the seat 10 has moved out of engagement with the seat rib 11, while in moving in the opposite direction, the valve 12 will seat before the seat 10 engages the seat rib 11.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a cock, valve means for controlling communication through a passage from one side of the cock to the other, and valve means for controlling communication through a larger passage from one side of the cock to the other.

2. An angle cock device comprising a cock, valve means operated upon a predetermined increase in pressure of fluid at one side of the cock for opening communication from one side of the cock to the other, and valve means operated upon a greater increase in pressure of fluid at one side of the cock for opening communication from one side of the cock to the other.

3. An angle cock device comprising a cock, and having a passage for establishing communication from one side of the cock to the other and a passage of greater flow area than the first passage for establishing communiction from one side of the cock to the other, valve means for controlling communication through the first passage, and separate valve means for controlling communication through the second passage.

4. An angle cock device comprising a cock, and having a passage for establishing communication from one side of the cock to other and a passage of greater flow area than the first passage for establishing communication from one side of the cock to the other, a piston adapted when seated to expose a limited area to the pressure of fluid at one side of the cock, a valve operated by said piston for controlling communication through the second passage, and a valve piston subject to the pressure of fluid at one side of the cock for controlling communication through the other passage.

5. An angle cock device comprising a cock, a valve for controlling communication from one side of the cock to the other and a piston having a movement relative to said valve for operating said valve.

6. An angle cock device comprising a cock, a valve for controlling communication from one side of the cock to the other and a piston for operating said valve and adapted to seat and expose a limited area to the pressure of fluid at one side of the cock and when unseated to expose the full area to said pressure, said piston having a movement relative to said valve.

7. An angle cock device comprising a cock, a valve for controlling a passage for establishing communication from one side of the cock to the other, a spring, and a piston subject to the pressure of said spring for operating said valve and adapted to seat and expose a limited area to the pressure of fluid at one side of the cock, said piston having a movement relative to said valve.

8. An angle cock device comprising a cock operative to supply fluid under pressure at a restricted rate from one side of the cock to the other, and valve means operated upon a predetermined increase in the pressure of fluid supplied to one side of the cock for opening a communication through which fluid under pressure is supplied from one side of the cock to the other at a rate less than an emergency rate.

9. An angle cock device comprising a cock, and having a passage permitting flow of fluid under pressure from one side of the cock to the other at an emergency rate and a passage restricting the flow of fluid under pressure from one side of the cock to the other to a rate less than the emergency rate, valve means for controlling communication through one passage, and valve means for controlling communication through the other passage.

10. An angle cock device comprising a cock, and having a passage permitting flow of fluid under pressure from one side of the cock to the other at an emergency rate and a passage restricting the flow of fluid under pressure from one side of the cock to the other to a rate less than the emergency rate, valve means operated upon a predetermined increase in the pressure of fluid at one side of the cock for opening communication through the first passage, and valve means operated upon a smaller predetermined increase in the pressure of fluid at one side of the cock for opening communication through the other passage.

In testimony whereof I have hereunto set my hand.

RANKIN J. BUSH.